(12) United States Patent
Park et al.

(10) Patent No.: US 8,559,348 B2
(45) Date of Patent: Oct. 15, 2013

(54) METHOD OF TRANSMITTING AND RECEIVING PAGING INFORMATION

(75) Inventors: Gi Won Park, Gyeonggi-do (KR); Young Soo Yuk, Gyeonggi-do (KR); Yong Ho Kim, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 13/057,450

(22) PCT Filed: Aug. 25, 2009

(86) PCT No.: PCT/KR2009/004727
§ 371 (c)(1),
(2), (4) Date: Feb. 3, 2011

(87) PCT Pub. No.: WO2010/024570
PCT Pub. Date: Mar. 4, 2010

(65) Prior Publication Data
US 2011/0134893 A1     Jun. 9, 2011

Related U.S. Application Data

(60) Provisional application No. 61/091,730, filed on Aug. 25, 2008.

(30) Foreign Application Priority Data

Jan. 7, 2009   (KR) .................. 10-2009-0001074

(51) Int. Cl.
*G08C 17/00*   (2006.01)

(52) U.S. Cl.
USPC ............ 370/311; 370/328; 455/458; 455/517

(58) Field of Classification Search
None
See application file for complete search history.

(56) References Cited

U.S. PATENT DOCUMENTS

| | | | | |
|---|---|---|---|---|
| 6,363,255 B1 * | 3/2002 | Kuwahara | ................... | 455/456.5 |
| 2006/0194598 A1 * | 8/2006 | Kim et al. | ..................... | 455/509 |

FOREIGN PATENT DOCUMENTS

| | | |
|---|---|---|
| JP | 2007-336491 | 12/2007 |
| KR | 10-2005-0072830 | 7/2005 |
| KR | 10-2006-0011555 | 2/2006 |
| KR | 10-2007-0032322 | 3/2007 |

* cited by examiner

*Primary Examiner* — Chi Pham
*Assistant Examiner* — Mohammad Adhami
(74) *Attorney, Agent, or Firm* — Lee, Hong, Degerman, Kang & Waimey

(57) ABSTRACT

Various methods of transmitting paging information in a wireless access system are disclosed. A method of transmitting paging information from a base station belonging to at least one paging groups according to one embodiment of the present invention includes the steps of allocating a paging group offset (PGO) per one specific one of at least one paging groups, transmitting a message including one paging group offset (PGO) per one specific paging group, and transmitting a broadcast channel (BCH) including paging group formation on the specific paging group at a timing point indicated by the paging group offset.

10 Claims, 9 Drawing Sheets

PG : Paging Group   ▨ Paging Group Information

PG1 : Primary Paging Group

PG2 ~ PG5 : Secondary Paging Group

METHOD OF TRANSMITTING AND RECEIVING PAGING INFORMATION

CROSS-REFERENCE TO RELATED APPLICATIONS

This application is the National Stage filing under 35 U.S.C. 371 of International Application No. PCT/KR2009/004727, filed on Aug. 25, 2009, which claims the benefit of earlier filing date and right of priority to Korean Application No. 10-2009-0001074, filed on Jan. 7, 2009, and also claims the benefit of U.S. Provisional Application Ser. No. 61/091,730, filed on Aug. 25, 2008, the contents of which are all hereby incorporated by reference herein in their entirety.

FIELD OF THE INVENTION

The present invention relates to a paging method in a wireless access system, and more particularly, to a method of transmitting and receiving paging information. Although the present invention is suitable for a wide scope of applications, it is particularly suitable for transmitting paging information in various ways.

DISCUSSION OF THE RELATED ART

In the following description, a paging group and an idle mode of a mobile station (MS) are schematically explained in association with embodiments of the present invention.

First of all, paging means a function for a base station (BS) or a paging controller (PC) to obtain a location (e.g., a prescribed base station, a prescribed switching station, etc.) of a mobile station (MS). At least one base station (BS) capable of supporting an idle mode is able to construct a paging area by belonging to at least one paging group (PG).

In this case, the paging group means a geographical group. An object of the paging group is to provide a user with an adjacent range area for paging in downlink (DL) if there is a data traffic that targets a mobile station (MS). Preferably, the paging group is large enough for a specific terminal to exist in a same paging group for most of time and is small enough for a paging load to maintain a proper level.

One base station can be included in one or more paging groups. The paging group is defined by a management system. And, the paging group is able to use a paging group-action backbone network message. Moreover, a paging controller (PC) manages a list of mobile stations in idle mode using a paging-announce message which is one of backbone network message and is also able to manage initial paging of all base stations belonging to a paging group.

An idle mode generally means an operation that supports a terminal to periodically perform downlink (DL) broadcast traffic transmissions without registering at a specific base station in case of moving a radio link constructed with multiple base stations.

The idle mode is able to give a mobile station the benefit by removing an activation request associated with handover and general management requests. The idle mode is able to save a power used by a mobile station and management resources by limiting a mobile station activity to be scanned in a discrete cycle.

The idle mode provides a simple and proper scheme for informing a mobile station of a pending downlink traffic. And, the idle mode is able to give a network and a base station the benefit by removing wireless interface and network handover (HO) traffics from a deactivated terminal.

SUMMARY OF THE INVENTION

Paging can be performed in idle mode by a paging group (PG) unit. For instance, one mobile station can be included in at least one paging group. Moreover, a paging controller (PC) of each paging group is able to perform paging for searching for a mobile station in case that there is a call outgoing to a specific terminal or an incoming external user packet.

In this case, if a specific base station is included in at least one multiple paging group, the base station is able to deliver paging information to a mobile station via a broadcast channel (BCH). Yet, in case that one base station is included in a plurality of paging groups, it is difficult for the base station to transmit paging information on all paging groups using the BCH having a limited size.

Accordingly, the present invention is directed to a method of transmitting and receiving paging information that substantially obviates one or more problems due to limitations and disadvantages of the related art.

An object of the present invention is to provide an efficient method of transmitting paging information.

Another object of the present invention is to provide a method for a base station or a paging controller to efficiently instruct a mobile station of paging.

A further object of the present invention is to provide a method of defining a paging group offset and enabling a base station or a paging controller to provide a mobile station with paging information using the paging group offset.

The technical objects realized and attained by the present invention are non-limited to the above mentioned objects. And, other unmentioned technical tasks can be taken into consideration by those having ordinary skill in the art, to which the present invention pertains, upon examination of the following embodiments of the present invention.

To achieve these objects and other advantages and in accordance with the purpose of the invention, as embodied and broadly described herein, the present invention provides various methods of transmitting paging information in a wireless access system.

In first aspect of the present invention, in transmitting a paging message from a base station belonging to at least one paging group, a method of transmitting paging message includes the steps of allocating a paging group offset (PGO) for each of the at least one paging group, transmitting a message including the at least one paging group offset (PGO), and transmitting the paging message for the paging group corresponding to the at least one paging group offset at a timing point indicated by the at least one paging group offset.

Preferably, the message is a deregistration command (MOB_DREG-CMD) message and the deregistration command message further includes a paging cycle parameter and a paging listening interval parameter.

More preferably, the method can further includes the step of receiving a deregistration request (MOB_DREG-REQ) message for requesting an entry into an idle mode from a mobile station.

Preferably, one of the at least one paging groups is a primary paging group and the rest of the at least one paging groups are secondary paging groups, according to an allocation sequence of the paging groups.

In second aspect of the present invention, in transmitting a paging message from a base station belonging to at least one paging group, a method of transmitting paging information includes the steps of allocating a paging group offset (PGO) per a prescribed number of paging groups in the at least one paging group, transmitting a message including the at least one paging group offset (PGO), and transmitting the paging message for the paging group corresponding to the at least one paging group offset at a timing point indicated by the at least one paging group offset.

Preferably, the method can further includes the step of receiving a deregistration request message for requesting an entry into an idle mode from a mobile station.

More preferably, the message is a deregistration command message and the deregistration command message further includes a paging cycle parameter and a paging listening interval parameter. In this case, the one of the at least one or more paging groups is a primary paging group and the rest of the at least one or more paging groups are secondary paging groups, according to an allocation sequence of the paging groups.

In third aspect of the present invention, when a mobile station receives a paging message from a base station belonging to at least one or more paging groups, a method of receiving paging message includes the steps of transmitting a deregistration request message for requesting an idle mode entry to the base station, receiving a deregistration command message including at least one paging group offset (PGO) for the at least one paging groups, and receiving a paging message for the at least one paging group at a timing point indicated by the at least one paging group offset (PGO), wherein the at least one paging group offset (PGO) is allocated per one or more of the at least one paging groups.

Preferably, the mobile station can belong to at least one of the at least one paging groups.

More preferably, the deregistration command message includes an identifier for the at least one paging group, a paging cycle parameter and a paging listening interval parameter.

In fourth aspect of the present invention, a base station, which supports a paging operation for a mobile station in an idle mode, includes a transmitting module controlling transmissions of messages used in the idle mode, a receiving module controlling receptions of the messages used in the idle mode, a memory storing a parameter and information element used in the idle mode, and a processor controlling an operation of the idle mode, wherein the processor allocates a paging group offset (PGO) for each of at least one paging groups to which the base station belongs, wherein the processor transmits a message including the at least one paging group offset (PGO) to the mobile station using the transmitting module, and wherein the processor controls a paging message for the paging group corresponding to the at least one paging group to be transmitted the mobile station at a timing point indicated by the at least one paging group offset using the transmitting module.

Preferably, the receiving module is able to receive a deregistration request message for requesting an entry into the idle mode from the mobile station.

More preferably, the message is a deregistration command message and the deregistration command message further includes a paging cycle parameter and a paging listening interval parameter.

Preferably, one of the at least one paging groups is a primary paging group and wherein the rest of the at least one paging groups are secondary paging groups, according to an allocation sequence of the paging groups.

In fifth aspect of the present invention, a mobile station, which receives a paging message in an idle mode from a base station belonging to at least one or more paging groups, includes a transmitting module controlling transmissions of messages used in the idle mode, a receiving module controlling receptions of the messages used in the idle mode, a memory storing a parameter and information element used in the idle mode, and a processor controlling an operation of the idle mode, wherein the processor transmits a deregistration request message for requesting an idle mode entry to the base station using the transmitting module, wherein the receiving module receives a deregistration command message including at least one paging group offset (PGO) for the at least one paging group and then delivers the received deregistration command message to the processor, wherein the processor receives a paging message for the paging group at a timing point indicated by the at least one paging group offset (PGO) using the transmitting module, and wherein the at least one paging group offset (PGO) is allocated per at least one of the at least one or more paging groups.

Preferably, the deregistration command message further includes a paging cycle parameter and a paging listening interval parameter.

Preferably, one of the at least one or more paging groups is a primary paging group and wherein the rest of the at least one or more paging groups are secondary paging groups, according to an allocation sequence of the paging groups.

In sixth aspect of the present invention, a method of transmitting paging information from a base station belonging to at least one or more paging groups includes the steps of allocating a paging group offset (PGO) per one specific one of at least one or more paging groups, transmitting a message including one paging group offset (PGO) per one specific paging group, and transmitting a broadcast channel (BCH) including paging group information on the specific paging group at a timing point indicated by the paging group offset.

Preferably, the message can further include a paging offset (PGO) indicating a timing point for monitoring a radio channel to receive a paging message or the broadcast channel. And, the paging group information can be included in either a primary broadcast channel (PBCH) or a secondary broadcast channel (SBCH) of the broadcast channel. In this case, the paging group information can include an identifier of the specific paging group and a paging indication parameter indicating a presence of the paging message for mobile stations belonging to the specific paging group.

Preferably, the message is a deregistration command message and the deregistration command message can further include a paging cycle parameter and a paging listening interval parameter. In this case, the method can further include the step of receiving a deregistration request message for requesting an entry into an idle mode from a mobile station.

In seventh aspect of the present invention, a method of transmitting paging information from a base station belonging to at least one or more paging groups includes the steps of allocating a paging group offset (PGO) per a prescribed number of paging groups among the at least one or more paging groups, transmitting a message including the allocated paging group offset (PGO), and transmitting multiple paging group informations on the prescribed number of the paging groups at a timing point indicated by the paging group offset (PGO).

Preferably, the multiple paging group information can be included in either a primary broadcast channel (PBCH) or a secondary broadcast channel (SBCH) of a broadcast channel. In this case, the multiple paging group information can include an identifier of the prescribed number of the paging groups and a paging indication parameter indicating a presence of a paging message for mobile stations belonging to the prescribed number of the paging groups. Preferably, the method can further include the step of receiving a deregistration request message for requesting an entry into an idle mode from a mobile station.

Preferably, the message is a deregistration command message and the deregistration command message can further include a paging cycle parameter and a paging listening interval parameter. In this case, In an eighth aspect of the present invention, a method of receiving paging information from a base station belonging to at least one or more paging groups includes the steps of transmitting a deregistration request message for requesting an idle mode entry to the base station, receiving a deregistration command message including a paging group offset (PGO) for the at least one paging group, and receiving a broadcast channel including paging group information on the at least one paging group at a timing point indicated by the paging group offset (PGO). In this case, the paging group offset (PGO) is preferably allocated per at least one of the at least one or more paging groups.

Preferably, a mobile station can belong to at least one of the at least one or more paging groups. More preferably, the paging group information can be included in either a primary broadcast channel (PBCH) or a secondary broadcast channel (SBCH) of the broadcast channel. And, the paging group information can include an identifier of the at least one paging group and a paging indication parameter indicating a presence of a paging message for the mobile station belonging to the at least one paging group.

Preferably, the deregistration command message can further include a paging offset (PO) indicating a timing point for monitoring a radio channel for receiving a paging message or the broadcast channel. More preferably, the deregistration command message can further include a paging cycle parameter and a paging listening interval parameter.

Accordingly, the present invention provides the following effects and/or advantages.

First of all, if a base station belongs to a plurality of paging groups, it is able to efficiently transmit paging information to mobile stations via BCH.

Secondly, a mobile station in idle mode awakes from its paging offset and/or paging group offset during a paging cycle and is then able to check BCH and paging messages.

Thirdly, if a system uses a paging group offset only, a mobile station awakes from a specific paging offset allocated to itself only during a paging cycle and is then able to decode paging information. Therefore, the mobile station is able to save a power by switching to a power save mode during the rest of the interval.

Fourthly, a base station transmits a plurality of paging group information to a mobile station in a manner of distributing the information within a paging cycle, thereby providing the mobile station with paging information efficiently using a size-limited BCH.

Effects attainable from the embodiments of the present invention are non-limited to the above-mentioned effects. Other unmentioned effects can be clearly derived and understood from the description of the following embodiments of the present invention by those having ordinary skill in the art to which the present invention pertains. Namely, effects unintended in the application stage of the present invention can be derived from the embodiments of the present invention by those having ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
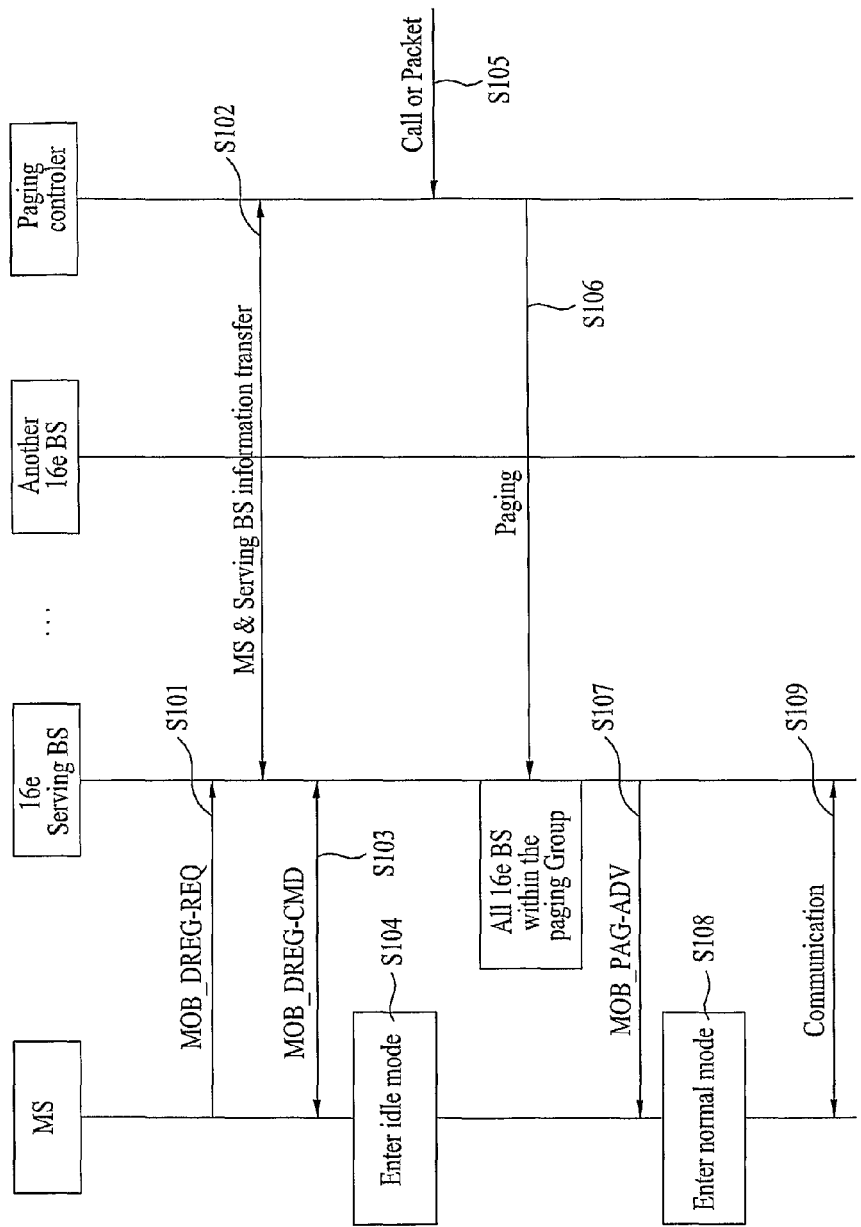
FIG. 1 is a diagram for a paging procedure in IEEE 802.16e system that is one of wireless access systems.

The present invention relates to a wireless access system and various methods for transmitting information are disclosed as follows.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of drawings, procedures or steps, which may ruin the substance of the present invention, are not explained. And, procedures or steps, which can be understood by those skilled in the art, are not explained as well.

In this disclosure, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an advanced base station (ABS), an access point and the like. And, 'mobile station (MS)' can be replaced by such a terminology as a user equipment (UE), a subscriber station (SS), a mobile subscriber station (MSS), an advanced mobile station (AMS), a mobile terminal and the like.

Moreover, a transmitting side means a node that transmits a data service or a speech service. And, a receiving side means a node that receives a data service or a speech service. Hence, a mobile station can become a transmitting side and a base station can become a receiving side, in uplink. Likewise, a mobile station becomes a receiving side and a base station can become a transmitting side, in downlink.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents.

Moreover, all terminologies disclosed in this document can be supported by at least one of P802.16-2004, P802.16e-2005, P802.16Rev2 and P802.16m documents which are the standards of IEEE 802.16 system.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention.

In the following description, specific terminologies used for embodiments of the present invention are provided to help the understanding of the present invention. And, the use of the specific terminology can be modified into another form within the scope of the technical idea of the present invention.

FIG. 1 is a diagram for a paging procedure in IEEE 802.16e system that is one of wireless access systems.

First of all, paging in idle mode can be performed by a paging group unit. For instance, a mobile station may belong to at least one or more paging groups. A paging controller (PC) of each of the paging groups performs paging for searching for a mobile station in case that a call or a user packet transmitted to the mobile station from an external network comes in. In doing so, the paging controller is able to perform the paging in a following manner. First of all, the paging controller delivers a paging message to all base stations within the paging group. Each of the base stations having received the paging message then broadcasts a paging advertisement (MOB_PAG-ADV) message to the mobile station.

Referring to FIG. 1, a mobile station (MS) transmits a deregistration request (MOB_DREG-REQ) message to a serving base station (SBS) to enter an idle mode from a normal mode [S101].

Having received the deregistration request message, the serving base station is able to transmit/receive terminal information and serving base station information to/from a paging controller. In particular, the serving base station is able to inform the paging controller of an identifier of a mobile station entering the idle mode and an identifier of the serving base station. Moreover, the paging controller is able to inform the serving base station of a paging group identifier (ID) or a paging controller identifier. In this case, the paging group identifier or the paging controller identifier is usable in transceiving a paging message [S102].

In response to the deregistration request message, the serving base station is able to transmit a deregistration command (MOB_DREG-CMD) message to the mobile station. In this case, the deregistration command message can include paging information (e.g., paging cycle, paging offset, paging listen interval, etc.). Moreover, the deregistration command message can further include a paging controller identifier (PC ID) and a paging group identifier (PG ID) [S103].

The mobile station checks the MOB_DREG-CMD and then enters the idle mode. Based on the paging information received via the MOB_DREG-CMD message, the mobile station is able to receive a paging message. In particular, the mobile station awakes from a paging offset and is then able to monitor radio channels to check whether there exists a paging message delivered to itself for a paging listen interval. During the rest of the time, the mobile station operates in sleep mode (or radio turn-off) to reduce power consumption [S104].

A call or an external packet may come into the paging controller [S105].

If the paging controller receives the call or the external packet, it is able to execute a paging procedure. In this case, the paging controller delivers a paging message to all base stations within a paging group [S106].

Having received the paging message, each of the base stations within the paging group broadcasts a MOB_PAG-ADV message to its mobile stations [S107].

The mobile station checks the MOB_PAG-ADV message. If the paging controller pages the corresponding mobile station, the corresponding mobile station enters a normal mode and is then able to perform communications with the serving base station [S108, S109].

Figure 2:
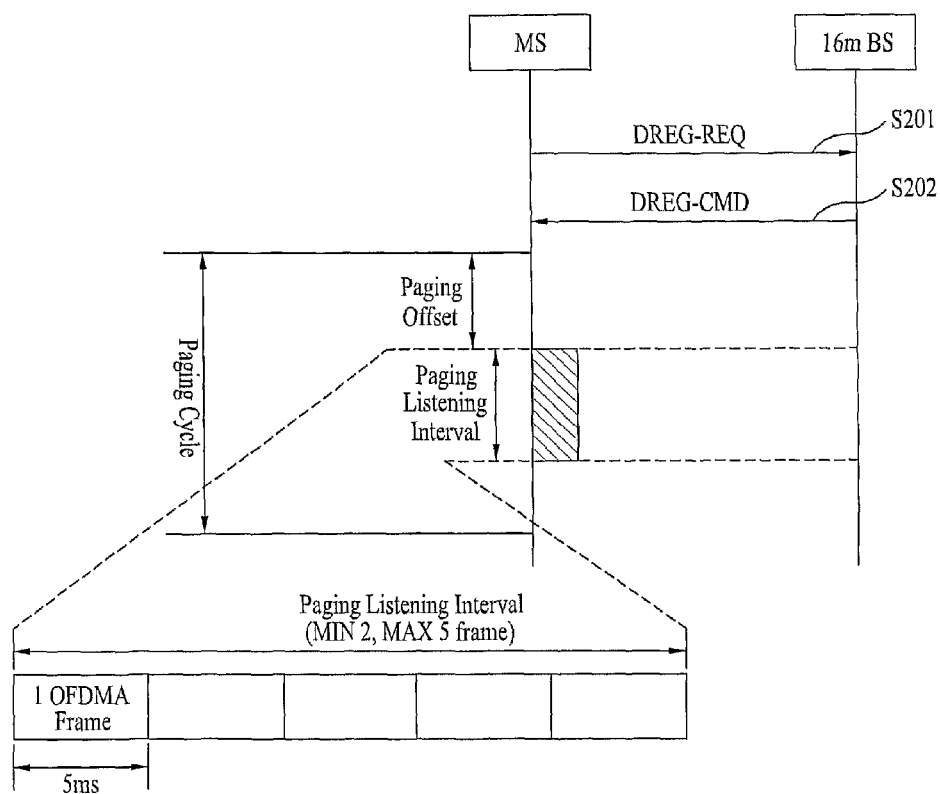
FIG. 2 is a diagram for an example of a paging procedure.

FIG. 2 is a diagram for an example of a paging procedure. Referring to FIG. 2, a mobile station (MS) makes a request for an idle mode entry by transmitting a deregistration request (DREG-REQ) message to a base station 16m BS) [S201]. The base station is then able to allow the idle mode entry by transmitting a deregistration command (DREG-CMD) message [S202].

Besides, the steps S201 and S202 can refer to the former steps S101 to S103 shown in FIG. 1.

The mobile station is able to receive a paging message by decoding a paging information field included in the deregistration command message. Therefore, the mobile station awakes from a paging offset during a paging cycle and is then able to monitor a radio channel for a paging listening interval. In FIG. 2, minimum 2 frames to maximum 5 frames can be allocated to the paging listening interval. In this case, it is preferable that one frame has a length of 5 ms.

A paging controller or the base station is able to perform paging by broadcasting a paging advertisement (MOB_PAG-ADV) message to the mobile station in the paging listening interval. For the rest of the paging cycle except the paging listening interval, the mobile station is able to operate in an idle mode.

The descriptions shown in FIG. 1 and FIG. 2 are applicable to the embodiments of the present invention described in the following.

Figure 3:
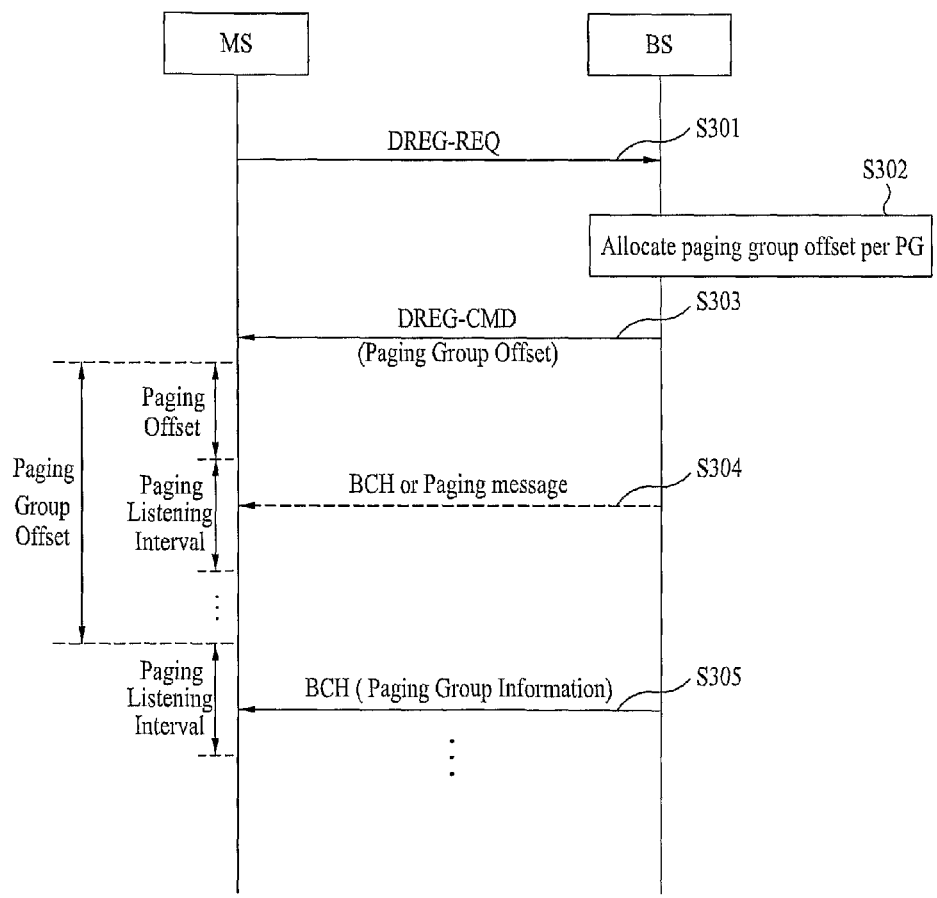
FIG. 3 is a diagram for one of methods of transmitting paging information according to one embodiment of the present invention.

FIG. 3 is a diagram for one of methods of transmitting paging information according to one embodiment of the present invention.

In a wireless access system, a specific base station (BS) can belong to multiple paging groups. Yet, limitation is put on the transmission of a large quantity of paging information (e.g., paging information on all paging groups to which the specific base station belongs) via a limited-size BCH from the specific base station to a mobile station (MS). Therefore, in FIG. 3, if a base station belongs to multiple paging groups, a method of transmitting paging information to a mobile station on BCH (or paging message) efficiently is proposed.

Referring to FIG. 3, a mobile station is able to make a request for an idle mode entry by transmitting a deregistration request (DREG-REQ) message to a base station (BS) [S301].

The base station is able to set a paging group offset (PGO) per paging group (PG) to which the base station belongs. And, the base station is able to set the paging group offset (PGO) by a super frame length unit. In particular, the base station is able to allocate a paging offset for one paging group per super frame [S302].

In the step S302, if the base station allocates a paging group offset for at least one multiple paging group, a paging group set first according to an allocation order of the paging groups can be called a primary paging group. And, other paging groups allocated behind the primary paging group can be called secondary paging groups. The base station is able to transmit a deregistration command (DREG-CMD) message including the paging group offset (PGO) allocated in the step S302, a paging listening interval and a paging cycle to the mobile station [S303].

The mobile station can monitor radio channels to receive a broadcast channel (BCH) or a paging message in each paging offset within the paging cycle. If there is a data traffic or paging information to transmit to the mobile station, the base station is able to transmit a broadcast channel or a paging message to the mobile station [S304].

Yet, the step S304 is a variable step. Therefore, the step S304 can be performed only if necessary.

The mobile station awakes from the paging group offset obtained in the step S303 and is then able to monitor radio channels during the paging listening interval. And, the base station is able to broadcast a broadcast channel, which includes paging group information on the corresponding paging group at a timing point corresponding to the paging group offset allocated per the paging group in the step S302, to the mobile station [S305].

FIG. 3 shows a case that a paging group offset and a paging offset can be used both. Therefore, the mobile station awakes from the paging offset and the paging group offset and is then able to monitor radio channels to receive a paging message or a broadcast channel for a prescribed paging listening interval.

In FIG. 3, the step S302 can be performed ahead of the step S301. Namely, the base station sets a paging group offset per paging group to which the base station belongs. The base station is then able to transmit the paging group offset to the mobile station if the mobile station makes a request for deregistration.

Figure 4:
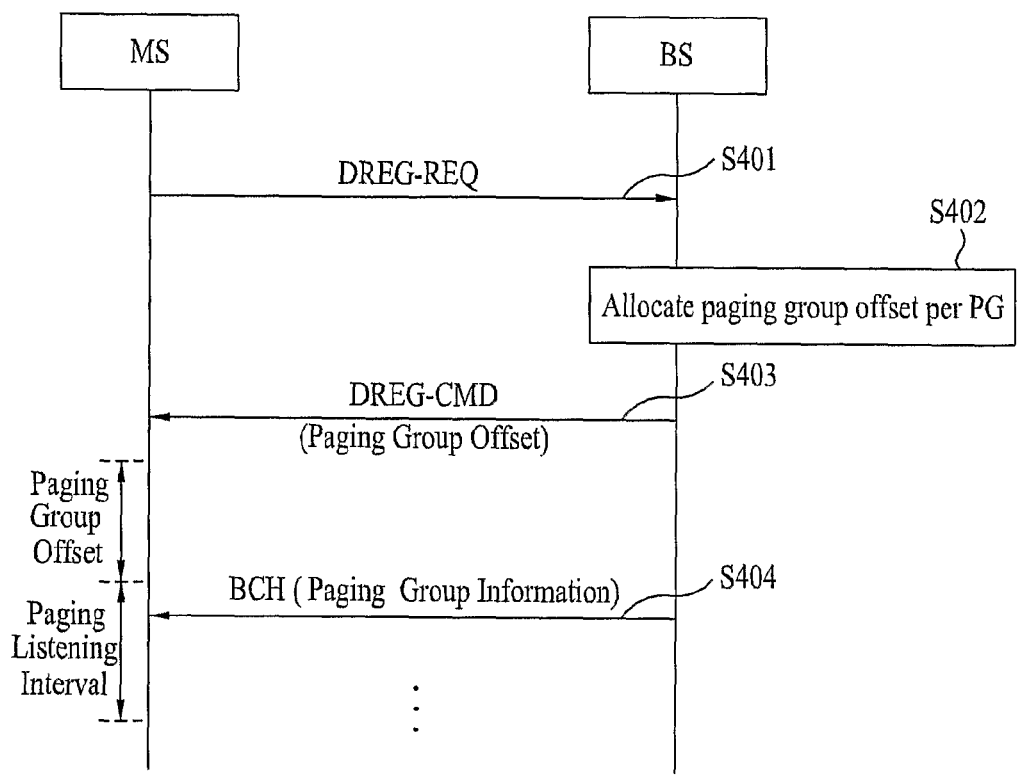
FIG. 4 is a diagram for another one of methods of transmitting paging information according to one embodiment of the present invention.

FIG. 4 is a diagram for another one of methods of transmitting paging information according to one embodiment of the present invention.

Since the following steps S401 to S403 are similar to the former steps S301 to S303 shown in FIG. 3, the former steps are referred to. Yet, assume that a base station in FIG. 4 uses a paging group offset only instead of a paging offset without transmitting a paging offset to a mobile station.

In particular, in the step S403, a base station is able to send a deregistration command (DREG-CMD) message including a paging group offset, a paging cycle and a paging listening interval only without a paging offset to a mobile station.

The mobile station awakes from the paging group offset and is then able to monitor radio channels during the paging listening interval. If the paging group offset is set by a super frame unit, the mobile station awakes from a super frame indicated by each super frame offset only and is then able to decode a radio channel. Moreover, the base station is able to broadcast a broadcast channel, which includes paging group information on each paging group, to mobile stations in the paging group offset allocated per paging group.

Figure 5:
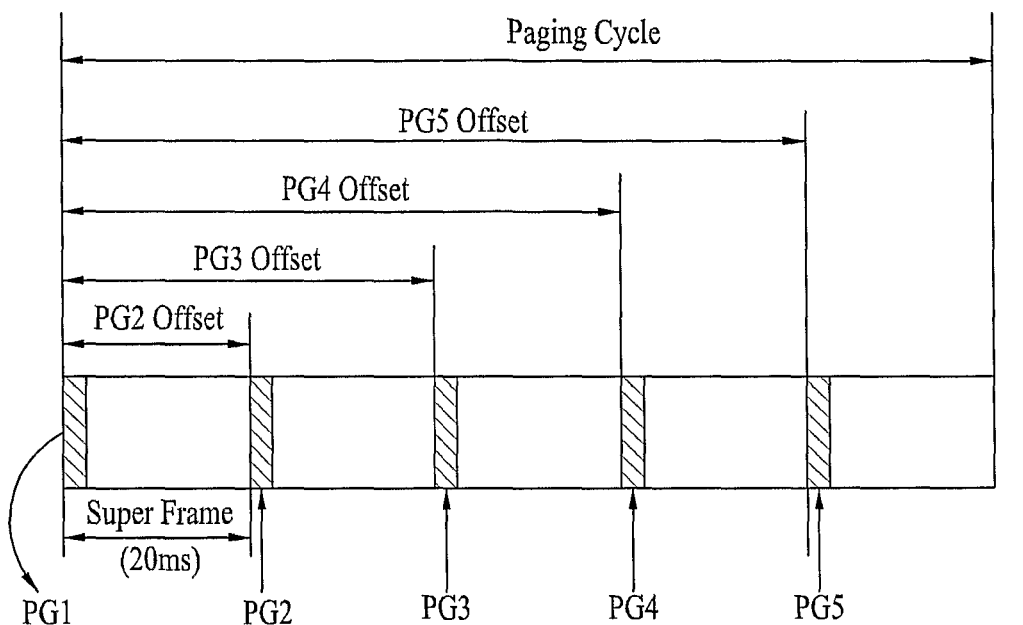
FIG. 5 is a diagram for one of methods of broadcasting paging information using BCH according to another embodiment of the present invention.

FIG. 5 is a diagram for one of methods of broadcasting paging message according to another embodiment of the present invention.

In FIG. 5, assume a case that a base station belongs to five paging groups. The base station is able to allocate a paging group offset (PGO) for each of the five paging groups. In this case, the base station is able to broadcast a paging message on each paging group (e.g., primary paging group and secondary paging groups) by a super frame unit within a paging cycle to mobile stations existing in each of the paging groups.

Referring to FIG. 5, a base station is able to broadcast a paging message for a paging group 1 (PG 1) to all mobile stations belonging to the paging group 1 (PG 1) in a paging group 1 offset (PG 1 offset: 0 ms). And, the base station is able to broadcast a paging message for a paging group 2 (PG 2) to all mobile stations belonging to the paging group 2 (PG 2) in a paging group 2 offset (PG 2 offset: 20 ms).

In this manner, the base station is able to broadcast a paging message of each paging group to all mobile stations belonging to the corresponding paging group in each paging group offset. In particular, the base station broadcasts a paging message on a first paging group (i.e., a primary paging group) to a mobile station in a PG 1 offset and then broadcast paging messages on the rest of the paging groups (i.e., secondary paging groups) to mobile stations in a PG 2 offset to a PG 5 offset.

Figure 6:
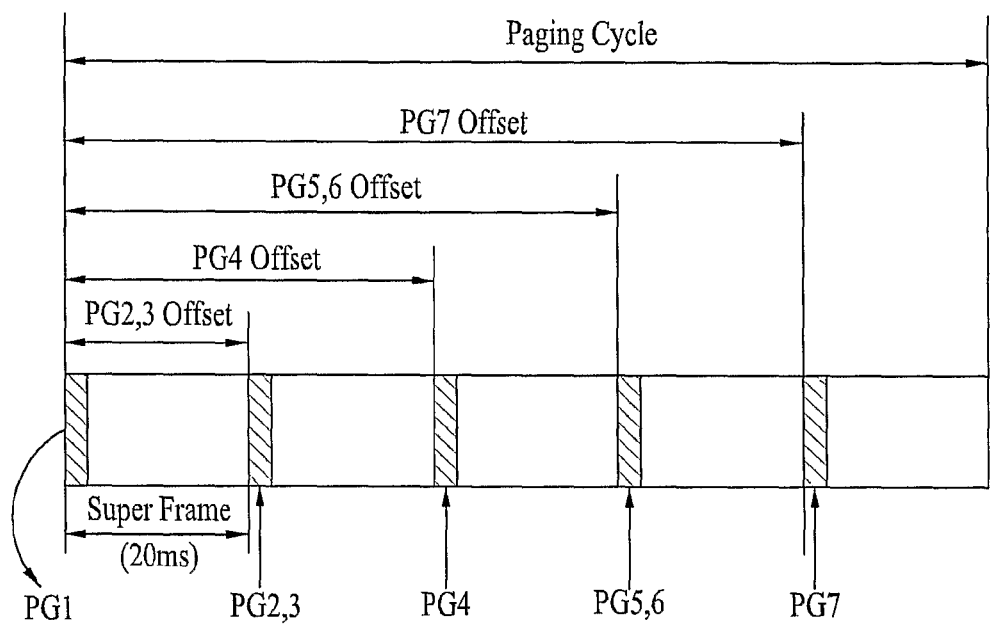
FIG. 6 is a diagram for another one of methods of broadcasting paging information using BCH according to another embodiment of the present invention.

FIG. 6 is a diagram for another one of methods of broadcasting paging information using BCH according to another embodiment of the present invention.

FIG. 6 is similar to FIG. 5 in that a paging message is sent to a mobile station in a manner that a paging group offset is set per paging group and then distributed to a paging cycle. Yet, FIG. 6 differs from FIG. 5 in that a base station broadcasts a paging message on at least one paging group in a specific paging offset.

Referring to FIG. 6, a base station is able to broadcast a paging message on a paging group 1 (PG 1) to all mobile stations belonging to the paging group 1 (PG 1) in a paging group offset 1 (PG 1 offset). And, the base station is able to broadcast BCH including a paging message on a paging group (PG 2) and a paging group 3 (PG 3) to all mobile stations belonging to the PG 2 and the PG 3 in a paging group offset 2 and 3 (PG 2, 3 offset).

And, the base station is able to broadcast a paging message on a paging group 5 (PG 5) and a paging group 6 (PG 6) to all mobile stations belonging to the PG 5 and the PG 6 in a paging group offset 2 and 3 (PG 5, 6 offset). In this manner, the base station is able to broadcast paging message on all paging groups, to which the base station belongs, to all mobile stations efficiently.

In particular, the base station broadcasts a paging message on a first paging group (i.e., a paging group 1 (PG 1) or a primary paging group) to a mobile station in a PG 1 offset. The base station is then able to broadcast paging messages on the rest of paging groups (i.e., paging groups 2 to 5 (PG 2 to PG 5) or secondary paging groups) to mobile stations in PG 2 offset to PG 5 offset, respectively.

In FIG. 5 or FIG. 6, a paging offset is allocated by a super frame unit. Yet, a paging offset can be allocated by at least one super frame unit or a prescribed number of frame units according to a user's request or a channel configuration. According to embodiments of the present invention, multiple paging groups mean at least two paging groups and multiple paging group information indicates paging information on at least two paging groups.

Figure 7:
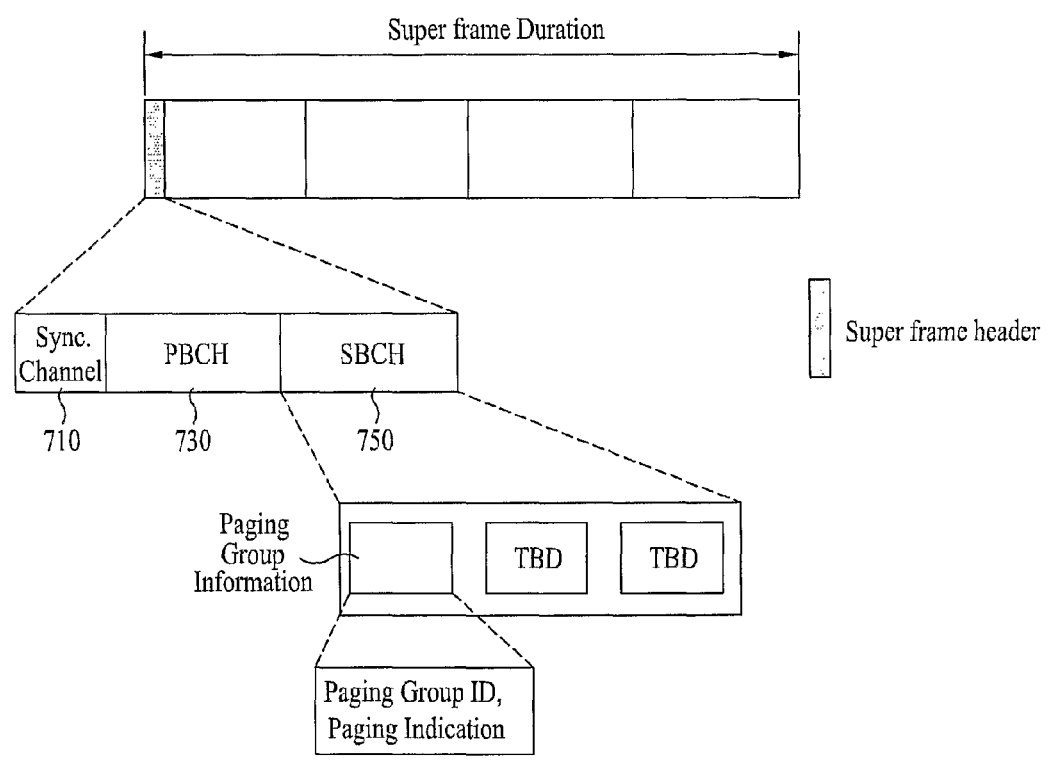
FIG. 7 is a diagram for an example of a broadcast channel structure including paging group information according to a further embodiment of the present invention.

FIG. 7 is a diagram for an example of a broadcast channel structure including paging group information according to a further embodiment of the present invention.

Like FIG. 5, FIG. 7 shows a case that paging information on one paging group is included in one BCH. According to embodiments of the present invention, one super frame is able to have a size of 20 ms. And, one super frame can include at least one or more frames (preferably, four frames). And, one frame can be constructed with eight subframes.

Referring to FIG. 7, it is able to transmit a super frame header (SFH) in a first subframe of a first frame included in a super frame. The super frame header (SFH) can include a sync channel (SC) 710 and a broadcast channel (BCH). In this case, the broadcast channel can include a primary broadcast channel (PBCH) 730 and a secondary broadcast channel (SBCH) 750.

A paging group information field can be included in the broadcast channel. In this case, the paging group information field can be included in the primary broadcast channel 730 or the secondary broadcast channel 750. In FIG. 7, shown is a case that the paging group information field is included in the secondary broadcast channel 750. And, a paging group identifier (ID) and a paging indication field can be included in the paging group information field.

In this case, the paging group identifier indicates a paging group to which a base station or a mobile station belongs. And, the paging indication field means a field for indication to find a corresponding mobile station in case that there is an incoming call from an external environment among terminals belonging to each paging group.

Figure 8:
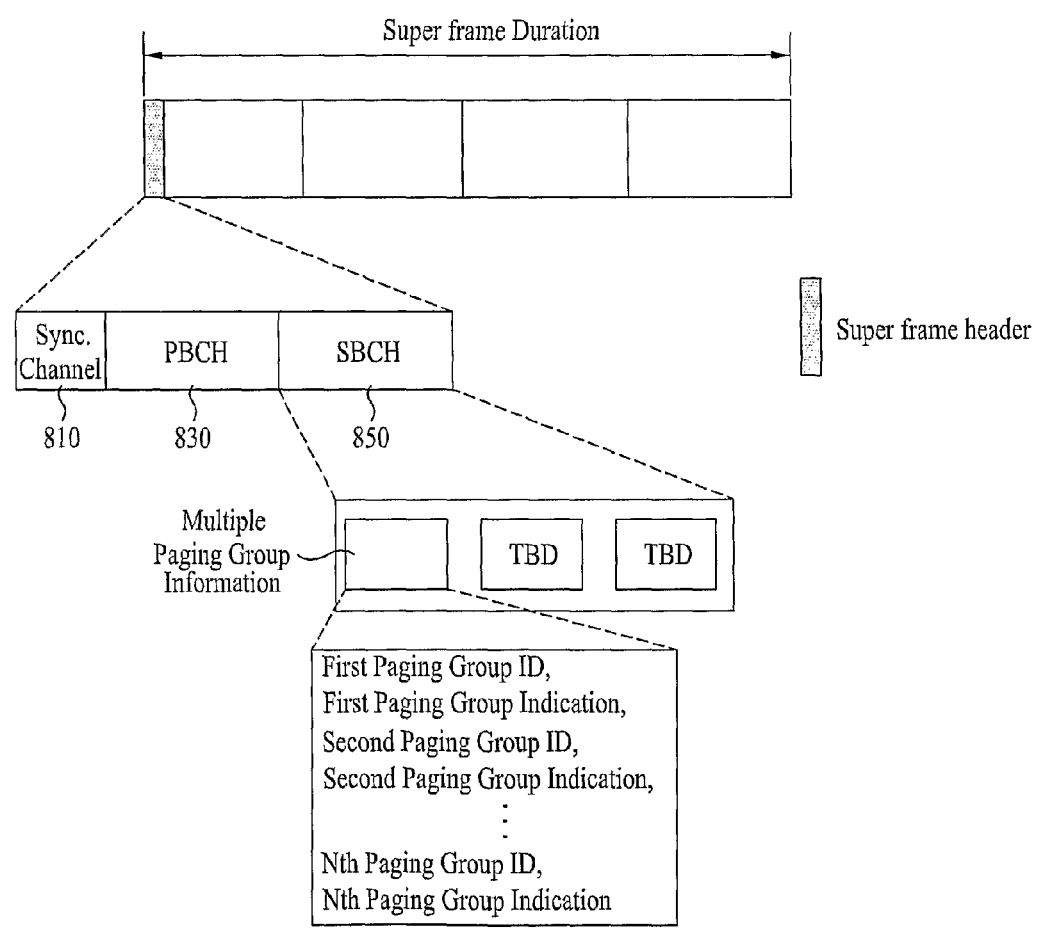
FIG. 8 is a diagram for another example of a broadcast channel structure including paging group information according to a further embodiment of the present invention.

FIG. 8 is a diagram for another example of a broadcast channel structure including paging group information according to a further embodiment of the present invention.

FIG. 8 shows a case that paging information on at least one paging group is included in one BCH like FIG. 6. Referring to FIG. 8, it is able to transmit a super frame header (SFH) in a first subframe of a first frame included in a super frame. The super frame header (SFH) can include a sync channel (SC) 810 and a broadcast channel (BCH). In this case, the broadcast channel can include a primary broadcast channel (PBCH) 830 and a secondary broadcast channel (SBCH) 850.

A multiple paging group information field indicating paging information on at least one paging group can be included in the broadcast channel. In this case, the multiple paging group information field can be included in the primary broadcast channel 830 or the secondary broadcast channel 850. In FIG. 8, shown is a case that at least one or more (e.g., N) paging group information fields are included in the secondary broadcast channel 850. In particular, at least one paging group identifiers (ID) and at least one paging indication fields can be included in the multiple paging group information field.

Figure 9:
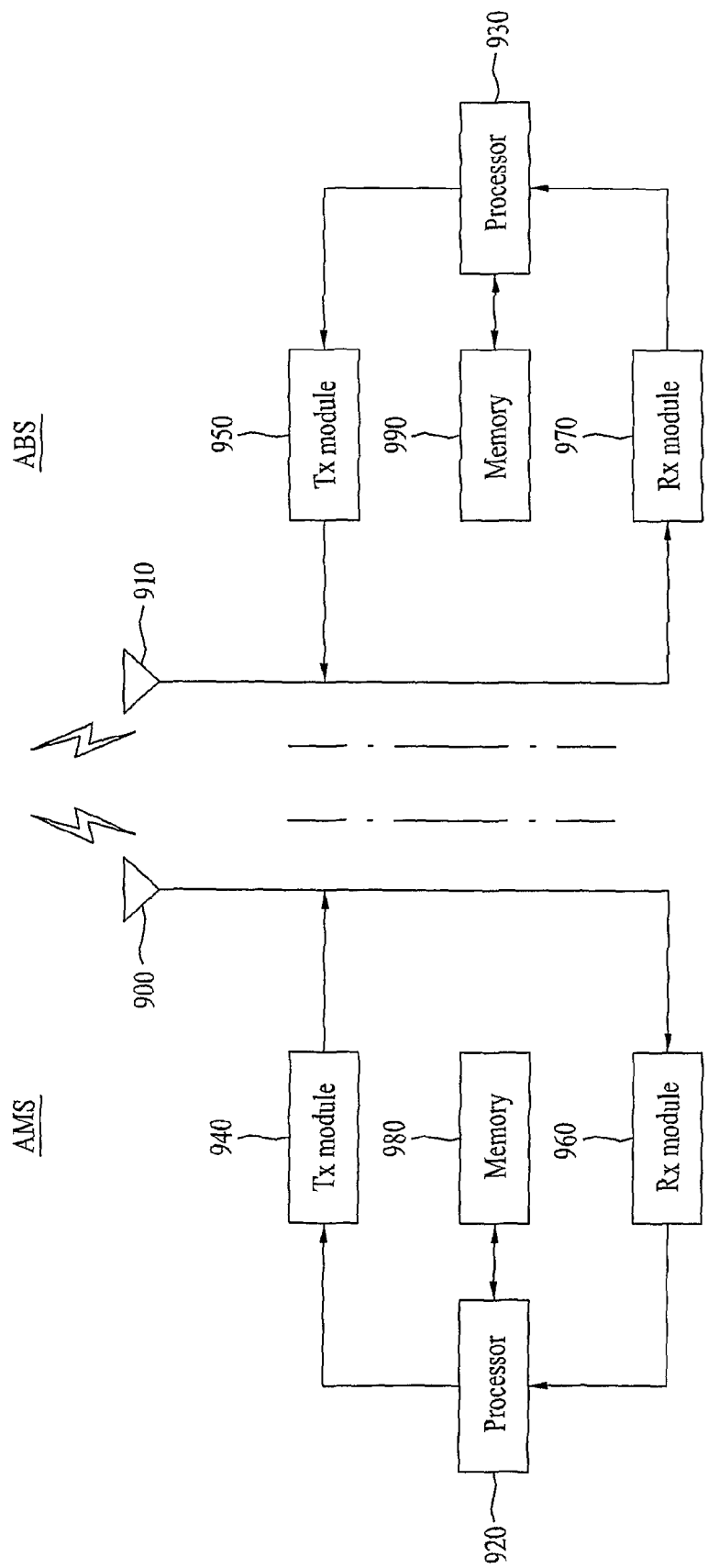
FIG. 9 is a diagram for a mobile station and a base station for performing embodiments of the present invention shown in FIGS. 2 to 8 according to another further embodiment of the present invention.

FIG. 9 is a diagram for a mobile station and a base station for performing embodiments of the present invention shown in FIGS. 2 to 8 according to another further embodiment of the present invention.

First of all, a mobile station (e.g. AMS) operates as a transmitter in uplink or can operate as a receiver in downlink. A base station (e.g. ABS) operates as a receiver in uplink or can operate as a transmitter in downlink.

In particular, the mobile station (MS) can include a transmitting module (Tx module) 940 and a receiving module (Rx module) 960 to control transmission and reception of information, data and/or message. The base station (BS) can include a transmitting module (Tx module) 950 and a receiving module (Rx module) 970 to control transmission and reception of information, data and/or message. The mobile and base stations can include antennas 900 and 910 to receive information, data and/or messages, respectively. Moreover, the mobile and base stations can include processors 920 and 930 for performing embodiments of the present invention and memories 980 and 990 for storing processing procedures of the processors temporarily or permanently, respectively.

In particular, the processor 920/930 can further include an idle mode module for performing an idle mode procedures disclosed in the embodiments of the present invention, an encryption module (or encryption means) for encrypting a prescribed message used in an idle mode, a decryption module (or decryption means) for interpreting the encrypted message, and the like. Moreover, the mobile/base station shown in FIG. 9 can further include a low power RF/IF (radio frequency/intermediate frequency) module.

The transmitting and receiving modules included in the mobile/base station can perform a packet modulation/demodulation function for data transmission, a fast packet channel coding function, an OFDMA (orthogonal frequency division multiple access) packet scheduling function, a TTD (time division duplex) packet scheduling function and/or a channel multiplexing function.

Moreover, the processor included in the mobile/base station can perform a control function of controlling transmissions of messages (e.g., DREG-REQ/CMD message, paging message, etc. associated with an idle mode, a handover function, an authentication and encryption function, a NAC (medium access control) frame variable control function according to service characteristics and propagation environment, a fast traffic real-time control function, a real-time modem control function and/or the like.

The devices described with reference to FIG. 9 are the means for implementing the methods described with reference to FIGS. 1 to 8. Therefore, it is able to implement the embodiments of the present invention using the aforesaid elements and functions of the mobile and base station systems.

The processor 920 provided to the mobile station includes the idle mode module for controlling an idle mode operation. The mobile station is able to perform an idle mode operation function using the idle mode module.

The processor 920 of the mobile station is able to monitor a radio channel according to a value of each paging group offset, as shown in FIG. 3 or FIG. 4. If a paging message is transmitted in each paging group offset, the processor of the mobile station is able to control an operation according to information included in the corresponding paging message.

The receiving module 960 of the mobile station receives a MOB_DREG-CMD message and/or a paging message transmitted from a serving station and then forwards the received message to the processor 920. The processor 920 stores paging group information included in the DREG-CMD message and/or the paging message in a memory and is then able to perform an idle mode operation using the paging group information.

The receiving module 970 of the serving base station is able to deliver a MOB_DREG-REQ message received via the antenna 950 to the processor 930. The processor 930 allocates a paging group offset for each multiple paging group, stores paging group information including a paging group offset value in the memory 990, and is then able to transmit a DREG-CMD message including the paging group information to the mobile station via the transmitting module 950.

Meanwhile, in the present invention, a mobile station can include one of a personal digital assistant (PDA), a cellular phone, a personal communication service (PCS) phone, a GSM (global system for mobile) phone, a WCDMA (wideband CDMA) phone, an MBS (mobile broadband system)

phone, a hand-held PC, a notebook PC, a smart phone, a MM-MB (multimode-multiband) terminal and the like.

In this case, the smart phone is a terminal provided with advantages of a mobile communication terminal and a PDA. The smart phone may mean a terminal in which a schedule management function of a PDA, data communication functions of fax transmission/reception, internet access, etc. are integrated on a mobile communication terminal. And, a multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit 980/990 and is then drivable by a processor 920/930. The memory unit is provided within or outside the processor to exchange data with the processor through the various well-known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a broadcast channel (BCH) message at a base station (BS) belonging to a plurality of paging groups, the method comprising:
    allocating a plurality of paging group offsets (PGOs) by a superframe length unit for each of the plurality of paging groups;
    transmitting a deregistration command (DREG-CMD) message including a paging offset and at least one of the plurality of PGOs, wherein the paging offset indicates a frame where a paging listening interval starts during a paging cycle, and the at least one of the plurality of PGOs indicates a superframe where the BCH message is transmitted; and
    transmitting the BCH message including paging group information at the superframe indicated by the at least one of the plurality of PGOs,
    wherein the DREG-CMD message further includes a paging cycle parameter related to the paging cycle and a paging listening interval parameter related to the paging listening interval.

2. The method of claim 1, further comprising:
    receiving a deregistration request message for requesting an entry into an idle mode from a mobile station.

3. The method of claim 1, wherein one of the plurality of paging groups is a primary paging group, and the rest of the plurality of paging groups are secondary paging groups.

4. A method of receiving a broadcast channel (BCH) message at a mobile station from a base station belonging to a plurality of paging groups, the method comprising:
    transmitting a deregistration request (DREG-REQ) message for requesting an idle mode entry to the base station;
    receiving a deregistration command (DREG-CMD) message including a paging offset and at least one of a plurality of paging group offsets (PGOs) allocated by a superframe length unit for the plurality of paging groups, wherein the paging offset indicates a frame where a paging listening interval starts during a paging cycle, and the at least one of the plurality of PGOs indicates a superframe where the BCH message is transmitted; and
    receiving the BCH message including paging group information at the superframe indicated by the at least one of the plurality of PGOs,
    wherein:
    the plurality of PGOs are allocated per the plurality of paging groups; and
    the DREG-CMD message further includes a paging cycle parameter related to the paging cycle and a paging listening interval parameter related to the paging listening interval.

5. The method of claim 4, wherein the mobile station belongs to one or more of the plurality of paging groups.

6. A base station supporting a paging operation for a mobile station in an idle mode, the base station comprising:
    a transmitting module;
    a receiving module;
    a memory storing a parameter and information element used in the idle mode; and
    a processor supporting the paging operation of the idle mode,
    wherein:
    the processor allocates a plurality of paging group offsets (PGOs) by a superframe length unit for each of a plurality of paging groups to which the base station belongs;
    the processor controls a transmission of a deregistration command (DREG-CMD) message including a paging offset and at least one of the plurality of the PGOs to the mobile station using the transmitting module;
    the paging offset indicates a frame where a paging listening interval starts during a paging cycle, and the at least one of the plurality of PGOs indicates a superframe where a broadcast channel (BCH) message is transmitted;
    the processor controls a transmission of the BCH message including paging group information at the superframe indicated by the at least one of the plurality of the PGOs; and
    the DREG-CMD message further includes a paging cycle parameter related to the paging cycle and a paging listening interval parameter related to the paging listening interval.

7. The base station of claim 6, wherein the receiving module receives a deregistration request (DREG-REQ) message for requesting an entry into the idle mode from the mobile station.

8. The base station of claim 6, wherein one of the plurality of paging groups is a primary paging group, and the rest of the plurality of paging groups are secondary paging groups.

9. A mobile station for receiving a broadcast channel (BCH) message in an idle mode from a base station belonging to a plurality of paging groups, the mobile station comprising:
    a transmitting module;
    a receiving module;

a memory storing a parameter and information element used in the idle mode; and a processor controlling an operation of the idle mode, wherein:

the processor controls the transmitting module to transmit a deregistration request message for requesting an idle mode entry to the base station;

the receiving module receives a deregistration command message including a paging offset and at least one of a plurality of paging group offsets (PGOs) allocated by a superframe length unit for the plurality of paging groups and then delivers the received deregistration command message to the processor;

the paging offset indicates a frame where a paging listening interval starts during a paging cycle, and the at least one of the plurality of PGOs indicates a superframe where a broadcast channel (BCH) message is transmitted;

the processor controls the receiving module to receive the BCH message including paging group information at the superframe indicated by the at least one of the plurality of PGOs;

the at least one of the plurality of PGOs is allocated per one or more of the plurality of paging groups; and the deregistration command message further includes a paging cycle parameter related to the paging cycle and a paging listening interval parameter related to the paging listening interval.

10. The mobile station of claim 9, wherein one of the plurality of paging groups is a primary paging group, and the rest of the plurality of paging groups are secondary paging groups.

* * * * *